2,905,662

PREPARATION OF TETRACYCLINE-UREA COMPOUND

Leland Leroy Smith, New City, N.Y., and Michael Marx, Leonia, and Siegfried Arthur Muller, Closter, N.J., assignors to American Cyanamid Company, New York, N.Y., a corporation of Maine No Drawing. Application May 11, 1956
Serial No. 584,168

4 Claims. (Cl. 260—96.5)

This invention relates to the preparation of a tetracycline-urea compound.

The novel compound of this invention may be prepared most simply by slurrying tetracycline in an aqueous solution of urea and then separating the tetracycline-urea compound so formed. Other procedures for preparing this compound will be described in detail hereinafter.

The novel compound of this invention is stable on prolonged storage and affords a convenient way of preparing stable tetracycline preparations from which pure tetracycline can be regenerated with ease. As such the new product offers possibilities for use in export or other situations where it becomes necessary to store tetracycline preparations for long periods of time without entailing losses in antibiotic potency. One of the important advantages of this compound is its use in refining tetracycline as described hereinafter.

The tetracycline-urea compound of this invention has a molar ratio of tetracycline to urea of one to one. The tetracycline-urea compound may be obtained in a series of hydrated forms, for example, as the trihydrate or as the monohydrate. The solubility in water of this compound is on the order of 325 gammas per milliliter. The optical rotation of the compound has been determined to be $[\alpha]_D^{25°}$ −220.0 as 0.5% solution in methanol; $[\alpha]_D^{25°}$ −229.0 as 0.5% solution in 0.03 N hydrochloric acid. The compound melts with decomposition at 143–146° C., and has dectinctive bands in the infrared spectra at $5.75\mu$ and $6.55\mu$ over and above the normal tetracycline infrared bands.

As indicated above, the tetracycline-urea compound of this invention may be prepared in a variety of ways. The easiest preparation involves a simple slurrying of tetracycline in an aqueous solution of urea and removing the precipitated tetracycline-urea compound so formed.

The use of this compound as an aid in refining or recovering relatively pure tetracycline from fermentation mashes or other solutions containing tetracycline as from reduced solutions of chlortetracycline, for example, constitutes one of the principal advantages of this compound.

In the copending application of Winterbottom et al., Serial No. 584,169, filed concurrently herewith, now abandoned, there is described and claimed an improved process of refining or recovering tetracycline from fermentation mashes or other solids containing tetracycline. The process as therein described involves filtering the fermented mash at an acid pH whereby the activity remains in the filtrate, adjusting the calcium ion content of the aqueous filtrate to a predetermined amount by the use of oxalate, adjusting the pH of the aqueous filtrate to a pH of between 8 and 12, and mixing therewith a quantity of a long chain alkyl quaternary ammonium compound, such as cetyltrimethylammonium chloride, and a water-immiscible, polar, organic solvent, such as methyl isobutyl ketone, whereupon the tetracycline is extracted into the solvent phase. The solvent phase is then separated from the aqueous phase containing fermentation impurities.

We have now discovered that the formation of a tetracycline-urea compound aids appreciably in the isolation or recovery of relatively pure tetracycline from solvent extracts containing crude tetracycline and associated impurities.

In this aspect of the present invention, an organic solvent extract of crude tetracycline, prepared as described in the aforesaid Winterbottom et al. application, for example, is contacted with an aqueous solution of urea. The mixture is agitated and the pH is adjusted to within the pH range of 2.5–6.0, and preferably to a pH of 3–4, by the addition of a suitable mineral acid such as hydrochloric acid, sulfuric acid, etc. whereupon the tetracycline-urea compound is formed and precipitates out of solution leaving the dissolved impurities behind. The tetracycline-urea compound is then recovered by filtration. This process results in the production of high quality tetracycline substantially free from impurities.

In this aspect of this invention we prefer to use from about 3 to about 20 equivalents of aqueous urea per equivalent of crude tetracycline in the solvent extract. The aqueous urea solution is preferably one-half saturated or less. Yields of 90% or better have been obtained of the tetracycline-urea compound from solvent extracts by this procedure.

In another aspect of the present invention, the formation of the tetracycline-urea compound may be utilized to isolate tetracycline from aqueous extracts containing tetracycline in a manner similar to that which may be used for recovering tetracycline from the organic solvent extracts as described above.

For example, according to the aforesaid copending Winterbottom et al. application the methyl isobutyl ketone extract of tetracycline may be contacted with acidulated water at a pH of 1.5–2.5. The two phases are mixed and separated and the acid salt of tetracycline passes into the aqueous phase. This acid water extract may then, if desired, be neutralized by the addition of base to a pH of 2.5–8 whereupon crude tetracycline neutral crystallizes from the solution.

According to this aspect of the present invention, instead of neutralizing the acid water extract with base and precipitating out neutral tetracycline, the acid water extract may be contacted with from about 6 equivalents to about 30 equivalents of solid urea per equivalent of tetracycline. The pH of the acid water extract may then be adjusted to within the pH range of about 3 to 5, whereupon the tetracycline-urea compound precipitates and may be recovered by filtration. As in the organic solvent extract process described earlier, the use of the tetracycline-urea compound in this acid water extract process also results in good recoveries of purified tetracycline free from associated impurities. This material, for example, is a trihydrate of high purity.

Similarly, the water extract prepared from the acid butanol extract of tetracycline from fermentation mashes as described in the copending Mendelsohn et al. application, Serial No. 518,961, filed June 29, 1955, now abandoned, may also be treated with solid urea to form the tetracycline-urea compound of this invention.

Another important use of this compound is involved in recovering tetracycline as a tetracycline-urea compound from solutions of tetracycline produced by the reductive dichlorination of chlortetracycline. This hydrogenolysis procedure is adequately described in the chemical literature, as for example, in J.A.C.S. 75, 4621. These reduced solutions of chlortetracycline may be contacted with aqueous urea in the amounts specified above to produce the tetracycline-urea compound of this invention. This procedure produces high quality tetracycline of high purity.

Still another use of the tetracycline-urea compound of this invention is involved in the formation of this compound in recrystallization procedures for further purifying tetracycline following recovery from the fermentation mash.

In this aspect of the present invention, crude tetracycline neutral as obtained, for example, by the procedure described in the aforesaid copending application of Mendelsohn et al., or the procedure described in the Winterbottom et al. application, is slurried in aqueous urea, in the amounts as stated hereinabove, and the pH is adjusted to a pH of between 3–5 whereby the tetracycline-urea compound as the trihydrate crystallizes out. Yields of the order of 85–90% have been obtained by this recrystallization procedure with an average purity of about 96–100%.

The tetracycline-urea compound may be dissociated in a number of ways in order to recover the tetracycline therefrom. One procedure involves slurrying the tetracycline-urea compound in a suitable hydroxylated organic solvent, such as butanol, 2-ethoxyethanol, etc. and treating with an acid so as to precipitate out an acid salt of tetracycline, the urea remaining in solution under these conditions. Hydrochloric acid may be used to form tetracycline hydrochloride for example. Tetracycline hydrochloride may also be formed by dissolving the tetracycline-urea compound in a mixture of 2-ethoxyethanol and butanol by the addition of base, i.e. triethylamine, followed by acidification with hydrochloric acid. Other acids such as formic acid, trichloracetic acid, etc. may, of course, be used. Another of the dissociation procedure involves conversion of the tetracycline-urea compound to neutral tetracycline by preparation of an organic solvent solution of the compound followed by reprecipitation of neutral tetracycline therefrom by adding water thereto and raising the pH of the solution to about neutrality. Suitable organic solvents are methanol, ethanol, butanol, acetone, tetrahydrofuran, etc. Neutral tetracycline may also be obtained by dissolving the compound in acidified water and neutralizing with alkali to crystallize neutral tratracycline. Conversion yields from the tetracycline-urea compound to tetracycline hydrochloride by the above procedures have been found to be of the order of 90%.

It is a surprising feature of the present invention that the formation of an insoluble urea compound can be produced, so far as we are aware, only with the antibiotic tetracycline. That is to say, the formation of an insoluble urea compound cannot be produced under these conditions when other antibiotics such as chlortetracycline, oxytetracycline, anhydrotetracycline, quatrimycin, chlorquatrimycin, etc., are substituted for the tetracycline. Just why this is so is not fully understood and no theory is advanced with respect thereto.

It is to be understood that this invention is not limited to the preparation of the tetracycline-urea compound from tetracycline per se, that is the free base, since it has been found that salts of tetracycline with acids and bases, that is the mineral acid salts of tetracycline, the alkali metal salts of tetracycline, the alkaline earth metal salts of tetracycline, the ammonium and amine salts of tetracycline, may be used with equal facility for preparing the tetracycline-urea compound of this invention.

The invention will be described in greater detail in conjunction with the following specific examples.

*Example 1*

(Following the procedure of the copending Winterbottom et al. application): Two liters of tetracycline mash assaying 5100 gammas per milliliter was acidified with 25% sulfuric acid to pH 1.8, stirred for 40 minutes, and filtered with the aid of 200 grams of Hyflo Super-Cel. The solids were slurried in 1.5 liters of 45° C. water, adjusted to pH 1.85 with 2.5 milliliters of 25% sulfuric acid, stirred for 40 minutes, and filtered. The filtrates were combined, treated with 88.2 grams of ammonium oxalate, stirred for 30 minutes at room temperature, stored at 4° C. for 2 hours, and filtered. The cake was washed with 50 milliliters of water to insure complete recovery of the activity. To the 2.97 liters of aqueous extract, 300 milliliters of methyl isobutyl ketone and 15 milliliters of 50% cetyltrimethylammonium chloride (Arquad 16) were added, and the mixture adjusted to pH 8.8 by treatment with 23 milliliters of 18 N NaOH. After stirring 20 minutes, two phases were separated. The aqueous phase was treated with 100 milliliters of methyl isobutyl ketone, 5 milliliters of 50% cetyltrimethylammonium chloride (Arquad 16), and 2 milliliters of 18 N NaOH to adjust the pH to 8.8. The mixture was stirred for 20 minutes, separated, and the aqueous phase extracted with another 100 milliliter portion of the same solvent. The combined extracts were shaken with 40 milliliters of water, and the aqueous wash was separated and discarded. A second wash with 40 milliliters of water was carried out, using sodium hydroxide to adjust the pH to 11.5 prior to filtration and separation.

*Example 2*

A 200 milliliter portion of clarified methyl isobutyl ketone extract (prepared as in Example 1), assaying 40,500 gammas of tetracycline per milliliter was treated with 32 milliliters of saturated aqueous urea solution and 32 milliliters of water. Concentrated hydrochloric acid was added to lower the pH from 9.0 to 5.5. The mixture was placed on a rotary shaker for 16 hours, adjusted to pH 3.0 by further addition of hydrochloric acid, and stirred for an additional 48 hours. The product which had precipitated was filtered, washed with water, and dried in vacuo at 50° C. A yield of 7.80 grams of tetracycline-urea compound assaying 939 gammas per milligram was obtained representing 90.3% of the calculated yield. *Analysis.*—Calc'd for tetracycline-urea monohydrate ($C_{23}H_{30}N_4O_{10}$): C, 52.80; H., 5.75; N, 10.72. Found: C, 52.85; H, 5.68; N, 10.70.

*Example 3*

To 1.05 liters of methyl isobutyl ketone extract assaying 95,400 gammas of tetracycline per milliliter and prepared as in Example 1, 525 milliliters of water was added, and the pH was adjusted to 1.75 by the addition of 52 milliliters of concentrated hydrochloric acid. The mixture was shaken and separated, to obtain 736 milliliters of aqueous phase assaying 124,800 gammas per milliliter. A 100 milliliter aliquot of the aqueous extract was stirred with 50 grams of urea until solution was complete. The pH was adjusted to pH 4.60 with 18 N sodium hydroxide and the mixture stirred for 24 hours. The product was filtered, washed with water, and dried in vacuo at 50° C. A yield of 10.78 grams of tetracycline-urea compound assaying 905 gammas per milligram was obtained representing 78.1% of the calculated yield.

*Example 4*

A 400 milliliter portion of aqueous extract assaying 67,500 gammas of tetracycline per milliliter and prepared as in Example 3 was stirred with 120 grams of urea until solution was complete, and the pH was raised to 3.3 by the addition of sodium hydroxide. After stirring gently for 40 hours, the precipitate was filtered, washed with water, and dried in vacuo at 50° C. A yield of 26.46 grams of tetracycline-urea compound assaying 932 gammas per milligram was obtained representing 91.2% of the calculated yield.

*Example 5*

(Following the procedure of the copending Mendelsohn et al. application Serial No. 518,961, now abandoned): Two liters of tetracycline mash assaying 3970 gammas per milliliter was treated with 10 grams of magnesium trisilicate (Magnesol) 120 grams of a filter aid (Hyflo) and adjusted to pH 7.6 with sodium hydroxide. The mixture was stirred 30 minutes and filtered. The cake was slurried in 600 milliliters of butanol and adjusted to a pH of 1.42 with 18 milliliters of concentrated hydrochloric acid. After stirring 40 minutes, the slurry was filtered. The cake was reslurried with 600 milliliters of butanol and 30 milliliters of water, adjusted to pH 1.47 with 2 milliliters of hydrochloric acid, stirred 40 minutes and filtered. The cake was slurried in 600 milliliters of butanol with 30 milliliters of water, and the pH adjusted to pH 1.38 by the addition of 1 milliliter of hydrochloric acid. The mixture was stirred for 40 minutes and filtered. The cake was washed with 250 milliliters of butanol.

The three butanol extracts and the butanol wash were combined, treated with 2 grams of decolorizing charcoal (Darco G–60) and 10 grams of sodium chloride, stirred for 15 minutes, and filtered with the use of a filter aid (Hyflo). The filtered solution was allowed to stand at 4° C. and separated to remove the brine phase. The clarified butanol extract was adjusted to pH 1.85 with 18 normal sodium hydroxide and concentrated in vacuo at 20–24° C. to approximately 110 milliliters. The concentrate was extracted 4 times with 110 milliliters of water, using concentrated hydrochloric acid to maintain a pH of 1.8–2.0. The combined water extract was washed twice with 22 milliliters of chloroform. The washed aqueous extract was concentrated in vacuo to 120 milliliters. To the concentrate 2.5 milliliters of butanol and 3 grams of 80 percent ethylenediaminetetraacetic acid tetrasodium salt (Versene) were added, and the pH adjusted to 6.2 with 18 normal sodium hydroxide. The solution was stirred overnight, and the crystals were filtered, washed twice with 6 milliliters of water saturated with butanol and dried in vacuo. A yield of 5.77 grams was obtained. The product assayed 1003 gammas per milligram. This represents an 81 percent yield from mash when allowances are made for assay samples removed during the process.

*Example 6*

Ten grams of crude tetracycline neutral (prepared as in Example 5) (815 gammas per milligram) was slurried for 30 minutes in 50 milliliters of saturated aqueous urea containing 4 drops of a wetting agent, isooctyl phenyl ether of polyethylene glycol (Triton X–100). Solution and recrystallization occurred simultaneously. The product was filtered, washed with water, then with ether, and vacuum dried. A yield of 8.54 grams of tetracycline urea compound was obtained, assaying 863 gammas per milligram. Yield 90.5% of the calculated.

*Example 7*

Five grams of tetracycline hydrochloride was stirred in 25 milliliters of saturated aqueous urea and 25 milliliters of water. A substantially complete solution formed and was filtered. Crystallization began almost immediately. The slurry was aged 5 hours and filtered. The product was washed with five 10 milliliter portions of water and vacuum dried to yield 3.34 grams of a tetracycline-urea trihydrate, M.P. 143–146° (decomposition). Spectophotometric assay was 842 gammas per milligram, microbiological (turbidimetric) assay was 810 gammas per milligram. *Analysis.*—Calc'd. for $C_{23}H_{28}N_4O_9 \cdot 3H_2O$: C, 49.46; H, 6.14; N, 10.03; urea 10.75. Found: C, 49.69; H, 6.42; N, 9.97; urea, 11.23. Optical rotation $[\alpha]_D^{25°}$ —220.0 as 0.5% solution in methanol. $[\alpha]_D^{25°}$ —229.0 as 0.5% solution in 0.03 N HCl.

*Example 8*

Five grams of chlortetracycline hydrochloride was mixed with 10 milliliters of 2-ethoxyethanol, 10 milliliters of butanol, 0.7 milliliter of water, 0.7 gram of 5% palladium catalyst on charcoal, and 3.4 milliliters of triethylamine. The mixture was reduced on a Parr shaker, taking up the calculated amount of hydrogen after 20 minutes. The catalyst was filtered and washed with 5 milliliters of butanol. The filtrate and washings were combined. To the combined solution was added 30 milliliters of saturated aqueous urea solution, 30 milliliters of water, and 0.83 milliliter of concentrated hydrochloric acid, to bring the pH of the mixture to about pH 3. After aging 28 hours the precipitated tetracycline-urea compound was filtered, washed and dried. The material weighed 4.0 grams and assayed 924 gammas per milligram, 3.36% water.

*Example 9*

A 5 gram portion of the compound prepared in Example 7, was slurried in 35 milliliters of 90:10 butanol:2-ethoxyethanol containing one calculated equivalent of concentrated hydrochloric acid. The resulting solution was filtered promptly, seeded, and stirred for 48 hours to permit crystallization. The product was filtered, washed with 2-propanol, and vacuum dried to yield 3.94 grams of tetracycline hydrochloride assaying 1002 gammas per milligram. Yield 91.4% of the calculated.

*Example 10*

Nine grams of the tetracycline-urea compound prepared in Example 2 was slurried in 45 milliliters of 2:1 butanol-2-ethoxyethanol and concentrated hydrochloric acid was added to lower the pH to 1.7. The mixture was stirred for 60 hours at room temperature and filtered. The product was washed with 2-propanol and vacuum dried to yield 7.49 grams of tetracycline hydrochloride assaying 982 gammas per milligram (90.2% conversion yield). The product passed all specification tests for oral grade tetracycline hydrochloride.

*Example 11*

Five grams of tetracycline-urea compound assaying 817 gammas per milligram was dissolved with heating in 100 milliliters of methanol to form a complete solution. The solution was filtered while warm and mixed with 100 milliliters of distilled water. The mixture was allowed to stand at room temperature for about 3 hours after which a crop of neutral tetracycline was filtered off, washed with water and dried in vacuo over $P_2O_5$. The product assayed at 1009 gammas per milligram. Microanalysis indicated that the product was a hydrated neutral tetracycline.

This application is in part a continuation of our application Serial No. 552,229, filed December 9, 1955, now abandoned.

We claim:

1. A tetracycline-urea compound having a molar ratio of tetracycline to urea of one to one, having a melting point of 143–146° C., being soluble in water to the extent of about 325 gammas per milliliter, having an optical rotation of $[\alpha]_D^{25}$ —220.0° (0.5% solution in methanol), an optical rotation of $[\alpha]_D^{25}$ —229.0° (0.5% solution in 0.03 N hydrochloric acid), and exhibiting characteristic absorption bands in the infrared region of the spectrum at 5.75 m$\mu$ and 6.55 m$\mu$.

2. The process of preparing tetracycline-urea compound which comprises contacting a compound of the group consisting of tetracycline and salts thereof with from about 3 to about 20 equivalents of urea per equivalent of tetracycline, and recovering the tetracycline-urea compound so formed.

3. The process of isolating tetracycline from a water-immiscible, polar, organic solvent solution of tetracycline which comprises contacting said solution with from about 3 to about 20 equivalents of aqueous urea per equivalent of tetracycline, adjusting the pH of said solution to within the pH range of about 2.5 to about 6 whereupon a tetracycline-urea compound precipitates, and recovering the tetracycline-urea compound from said organic solution.

4. The process of isolating tetracycline from acidulated aqueous solutions of tetracycline which comprises contacting said solution with from about 6 to about 30 equivalents of solid urea per equivalent of tetracycline, adjusting the pH of the aqueous solution to within the pH range of about 3 to about 5 whereupon a tetracycline-urea compound precipitates, and recovering the tetracycline-urea compound from the aqueous solution.

References Cited in the file of this patent

UNITED STATES PATENTS

| | | |
|---|---|---|
| 2,596,344 | Newey et al. | May 13, 1952 |
| 2,634,261 | Fetterly | Apr. 7, 1953 |
| 2,663,671 | Wiles et al. | Dec. 22, 1953 |
| 2,699,054 | Conover | Jan. 11, 1955 |

OTHER REFERENCES

Antibiotics Annual, English et al., 1953–1954, pp. 70–80.

Stedman's Med. Dictionary, seventeenth ed., 1949, Williams and Wilkins Co., Baltimore, pp. 1272 and 1273.

Kawakami et al.: Journal of Antibiotics, vol. 4 (1951), pp. 43 to 47.